United States Patent [19]  [11] 4,100,264
Heytmeijer et al.  [45] Jul. 11, 1978

[54] PROCESS FOR THE PREPARATION OF CALCIUM CARBONATE FOR USE IN FLUORESCENT LAMP PHOSPHORS

[75] Inventors: Herman R. Heytmeijer, Hanover Township, Morris County; Larry P. Rusch, Edison; Giuseppe Grasso, Parsippany Troy Hills, all of N.J.

[73] Assignee: Westinghouse Electric Corp., Pittsburgh, Pa.

[21] Appl. No.: 754,051

[22] Filed: Dec. 23, 1976

[51] Int. Cl.² .............................................. C01F 11/18
[52] U.S. Cl. .................................... 423/430; 423/165; 423/431; 23/304
[58] Field of Search ....................... 423/430, 431, 165; 23/304

[56] References Cited

U.S. PATENT DOCUMENTS 3,321,269  5/1967  Yasui et al. ..................... 423/431

FOREIGN PATENT DOCUMENTS 32,532  10/1970  Japan .................................. 252/430

OTHER PUBLICATIONS

"Chemical Abstracts," vol. 71, 1969 — 23,290z.
"Chemical Abstracts," vol. 76, 1972 — 7,426w.

Primary Examiner—G. O. Peters
Attorney, Agent, or Firm—R. S. Lombard

[57] ABSTRACT

A method of producing finely-divided phosphor grade calcium carbonate having a calcite crystalline structure and a very low sodium content. The calcium carbonate is produced from calcium chloride having a high sodium impurity content, such as calcium chloride which is a by-product of the Solvay process for producing soda ash.

8 Claims, No Drawings

PROCESS FOR THE PREPARATION OF CALCIUM CARBONATE FOR USE IN FLUORESCENT LAMP PHOSPHORS

BACKGROUND OF THE INVENTION

Calcium carbonate can be precipitated in three different crystalline forms—calcite, aragonite or vaterite, although calcite is the only stable form of calcium carbonate at room temperature and atmospheric pressure. Provided the three crystalline forms are of adequate purity, all three crystalline forms or mixtures thereof can be satisfactorily used to produce high quality fluorescent lamp phosphors. An important consideration in this respect is the sodium content of the calcium carbonate, because sodium quenches the brightness of fluorescent phosphors.

Because vaterite is a scavenger of sodium and other cations, it is not normally used as a raw material for halophosphate type phosphors. U.S. Pat. No. 3,578,603 dated May 11, 1971 issued to E. A. Dale et al., however, teaches the preparation of a low sodium type vaterite and claims brightness gains in its corresponding phosphors as a result of the high reactivity of its meta-stable crystalline structure. It further teaches that to insure the formation of high purity vaterite, raw materials for its manufacture must be prepared in a certain manner so that sodium does not enter into them. Clearly, the use of an inexpensive raw material, such as calcium chloride which is a by-product of the Solvay process for producing soda ash which has a typical analysis of 1.6% sodium chloride, is precluded.

Aragonite is also thermodynamically unstable; however, it does not scavenge sodium ions from solution. Aragonite though is economically unattractive in that it requires high precipitating temperatures as well as high pH values to precipitate pure aragonite.

For the foregoing reasons and because it forms easily and has no particular affinity for sodium, calcite is the usual form in which phosphor grade calcium carbonate is prepared. Disclosed in the present application is an inexpensive and commercially practical method of making a very low sodium, finely-divided phosphor grade calcium carbonate.

SUMMARY OF THE INVENTION

This invention provides a method of producing finely-divided phosphor grade calcium carbonate having a calcite crystalline structure and a very low sodium content. The phosphor grade calcium carbonate is produced from calcium chloride having a high sodium impurity content.

The method entails first forming finely-divided meta-stable vaterite on a continuous basis. This is accomplished by continuously adding to an agitated precipitating tank aqueous solutions of calcium chloride and ammonium carbonate in such respective concentrations as to stoichiometrically produce calcium carbonate precipitate and ammonium chloride. The resulting meta-stable vaterite precipitate is separated from the mother liquor. Separated vaterite is then resuspended in an aqueous medium. The resuspended vaterite is then heated to a temperature of at least 80° C for a sufficient period of time to cause the crystal structure of the vaterite to completely recrystallize to calcite. The recrystallization is accomplished by a release of most of the contained sodium impurities from the calcium carbonate crystal so that the conversion of vaterite to calcite is in effect a purification step. The resulting calcite is then recovered for use in preparing phosphor materials.

DESCRIPTION OF THE PREFERRED EMBODIMENT

This invention relates to a method of producing finely-divided phosphor grade calcium carbonate having a calcite crystalline structure and a very low sodium content. The phosphor grade calcium carbonate is produced from calcium chloride having a high sodium impurity content, such as calcium chloride which is a by-product of the Solvay process for producing soda ash.

The method entails first forming finely-divided meta-stable vaterite on a continuous basis by continuously adding to an agitated precipitating tank aqueous solutions of calcium chloride and ammonium carbonate in such respective concentrations as to stoichiometrically produce calcium carbonate precipitate and ammonium chloride. The preparation of the reactants may be accomplished in the following conventional manner. Approximately 2.6 molar $CaCl_2$ solution is prepared by dissolving in an agitated tank Solvay type calcium chloride in water. The temperature of the resultant solution rises to about 56° C. The solution typically contains iron hydroxide, calcium sulfate, calcium carbonate, calcium hydroxide, and other impurities. These impurities may be substantially removed in the following manner. HCl is added to the solution until a pH of about 2 is reached and the solubilized impurities are dissolved. A 30% of $H_2O_2$ solution is then added to the foregoing solution to oxidize any ferrous iron to ferric iron. A freshly slaked lime slurry is then added to the resulting solution to raise the pH to about 8.5 or 9. The dissolved iron precipitates out of the solution as ferric hydroxide. The solution is then allowed to stand for about 48 hours in a tank having a side drawoff valve to permit almost all the impurities to settle to the bottom of the tank and to allow the solution to cool. The clear liquid is then drawn off through the side drawoff valve and is run through a cartridge type filter. Following the filtration, the clear solution is diluted to about 2.5 molar and adjusted, if necessary, to pH 3.5. An alternative system such as using a horizontal plate filter with a filter aid may be used to eliminate the long settling time required by this method. The foregoing preliminary processing of calcium chloride that is a by-product of the Solvay process is for the purpose of removing the iron and calcium sulfate and other minor impurities, and is not a part of the present invention which is concerned with removing sodium from the calcium chloride.

Approximately 2.5 molar ammonium carbonate solution is prepared by dissolving food grade $NH_4HCO_3$ in water that contains sufficient $NH_4OH$ to stoichiometrically convert all $NH_4HCO_3$ to $(NH_4)_2CO_3$. Alternatively, the $(NH_4)_2CO_3$ solution may be prepared by reacting $CO_2$ with $NH_3$ and water. Carbonate solutions that are deficient in $NH_3$ tend to produce vaterite that is coarse. Excess $NH_3$ is wasteful although it slightly lowers the Na content of the end product.

During the reaction the concentration of the ammonium carbonate solution and the calcium chloride solution is maintained at about 2.5 molar. Although the successful precipitation of vaterite is possible from reactant solutions that are less concentrated than 2.5 molar, high concentrations are preferred because they permit the highest production rates and yet yield a low Na product. Although the pH of the calcium chloride solution is not particularly critical and may be in the range of about 3 to 10, it is preferably adjusted to pH 3.5 to prevent the formation of $CaCO_3$ scum such as develops on alkaline solutions.

The precipitation of the vaterite is performed on a continuous basis by simultaneously and continuously metering the required flows of calcium chloride and ammonium carbonate solution into a precipitator. To assure maximum yield of precipitation and to minimize cloth blinding and cementing problems during the subsequent filtration step, the precipitation is preferably carried on a stoichiometric basis. Such condition is considered to exist if a sample of clear, filtered mother liquor "throws" only a trace of precipitate upon addition of either calcium chloride or ammonium carbonate solution.

The precipitator may consist of one, but preferably two or more, tanks designed to agitate the contents. In case a plurality of tanks is used, they are arranged in series and may conveniently be equipped with cascading overflows. The first tank or primary reactor receives the calcium chloride and ammonium carbonate reactant solution on a continuous basis. The precipitation of vaterite takes place mostly in this vessel. Any additional tanks serve merely to provide sufficient time to complete the chemical reaction for the proper crystallization of the vaterite.

The reactors must be properly sized with respect to the fluid flow rates used. The working capacity of the reaction tanks that follow the primary reactor should be sufficient to provide adequate residence time for the vaterite slurry to allow it to complete its reaction prior to the subsequent filtration step. Excessive residence time, however, is undesirable because the vaterite continues to grow in size when left in contact with the mother liquor.

Following the precipitation, the resulting metastable vaterite precipitate is separated from the mother liquor prior to recrystallization. This is done for two reasons. First, the mother liquor contains appreciable NaCl which is undesirable to have present during recrystallization. Second, when the vaterite is recrystallized in its mother liquor, excessive particle size growth occurs. Separation of mother liquor and vaterite crystals may be performed in various ways which include decanting, centrifuging or filtering. In this embodiment, the separation of precipitate and mother liquor is obtained by filtration. The equipment most suited for this has been found to be a rotary vacuum filter or a horizontal traveling belt filter. The latter type is preferred, however, because it is not equipped with a slurry holding tank, but rather is a toploading filter. Thus, it is not subject to difficulties caused by solids that settle out of suspension and tend to cement in place. More importantly, however, the design of the belt filter is such that the filter medium can be easily and thoroughly rinsed during each revolution. This is very important when filtering vaterite to prevent cloth blinding as a result of the build-up of calcite particles that have recrystallized in situ.

It has been discovered that washing of the vaterite cake on the filter has a pronounced detrimental effect upon the subsequent recrystallization process, in that, washed vaterite only very slowly converts to calcite. While unwashed vaterite easily and rapidly converts to calcite when heated to about 85° C, washed vaterite requires about 1½ hours of heating at 95° C to complete its recrystallization.

The filter cake as it is being discharged from the filter may be stored as is, pending recrystallization. Alternatively, it may be continuously reslurried in water and pumped to a holding tank or directly into the crystallizer. No significant changes occur in the precipitate when stored up to several hours in either form.

The separated vaterite is then resuspended in an aqueous medium. The resuspended vaterite is then heated to a temperature of at least 80° C for a sufficient period of time to cause the crystal structure of the vaterite to completely convert the calcite. Recrystallization of vaterite to calcite has been successfully effected in steam jacketed glass-lined tanks by stirring and heating slurries containing from less than 35 gms $CaCO_3$/l to those having a solids content greater than 245 gms/l. Because the increase in solids content has no detrimental effect upon particle size nor on the residual Na content of the end product, high solids loadings during recrystallization are preferred. When using a low shear retreat curve impeller for agitation, the stirring rate has no effect upon particle size. High shear propeller mixers do tend to produce a slight drop in particle size from, for example, 10 microns to 8 microns. To assure optimum heat transfer into the slurry and to prevent any chance of settling of the solids, the stirring rate must be maintained at a high level.

The recrystallization of vaterite to calcite is temperature-time dependent; however, to assure complete conversion and lowest possible Na content of the product, it is preferred to heat the slurry to about 85° C in approximately 38 minutes followed by a 20 minute digestion period at this temperature. The Na content of the final product is directly related to its residual vaterite content as is shown by X-ray diffraction data obtained on samples of slurry that were removed as the recrystallization proceeded:

| | Sodium Content Of $CaCO_3$ As Related To Its Residual Vaterite Content | | |
|---|---|---|---|
| | X-Ray Diffraction Intensity | | |
| | Vaterite d = 3.39 | Calcite d = 3.04 | Na Content ppm |
| Precipitate | 3279 | <100 | |
| Sample #1 | 3010 | 2659 | 333 |
| Sample #2 | 2885 | 3548 | 315 |
| Sample #3 | 2314 | 6656 | 275 |
| Sample #4 | 1884 | 8574 | 235 |
| Sample #5 | 818 | 12,877 | 126 |
| Sample #6 | 334 | 13,853 | 59 |
| Sample #7 | <100 | 14,215 | 41 |
| Sample #8 | Not detected | 13,223 | 17 |

After the recrystallization has been completed, the calcite product may be recovered by conventional means such as centrifuging or filtering. The collected solids are washed free from $Cl^-$ and finally dried in any one of the various types of dryers. The calcite recovered has a particle size in the range from about 7 to 11 microns and a sodium content in the range from about 10 to 35 ppm.

To further elucidate the invention, the following more specific embodiment is provided. 2.5 molar room temperature, calcium chloride and ammonium carbonate solutions are simultaneously and continuously added at 10.7 l/min. each to a 70 l working capacity, stirred, primary reactor. The resultant vaterite precipitate slurry overflow is continuously added into a 235 l working capacity-agitated tank and from there into a 3X1 rotary drum vacuum filter for removal of its mother liquor. The cake that is discharged from the filter is allowed to drop into a 250 l capacity reslurrying tank and redispersed in water that is added at a rate of about 10 l/min. A transfer pump which is controlled by a level sensor device on the tank, periodically pumps excess slurry either into a 300 gallon, steam heated glass-lined tank for recrystallization or into an agitated holding tank for subsequent processing.

In the recrystallization process, an amount of vaterite equivalent to 100 minutes of precipitation or about 600 lbs. of dry $CaCO_3$ is transferred to the glass-lined tank, diluted to 1300 l and heated under vigorous agitation to 85° C in about 40 minutes. When this temperature is reached, the steam is shut off, although stirring is continued for an additional 20 minutes to assure complete conversion of all vaterite to calcite. At the end of the digestion period, the stirrer is shut off. After the solids have settled, the hot supernatant liquid is syphoned off and about 550 l cold water added to cool the slurry to about 55° C. The calcite product is finally collected by centrifuging or filtering and washed free of $Cl^-$ with about 700 l of water. The washed cake is dried, yielding about 600 lbs. of calcite having a particle size from about 8 to 11 microns and having a residual Na content of approximately 10 to 35 ppm.

We claim:

1. The method of producing finely-divided phosphor grade calcium carbonate having a calcite crystalline structure and a very low sodium content from calcium chloride having a high sodium impurity content such as 1.6% sodium chloride, which method comprises:
   (a) forming finely-divided meta-stable vaterite on a continuous basis by continuously adding to an agitated precipitating tank aqueous solutions of calcium chloride and diammonium carbonate in such respective concentrations as to stoichiometrically produce calcium carbonate precipitate and ammonium chloride;
   (b) separating the resulting meta-stable vaterite precipitate from the mother liquor, and then resuspending the separated vaterite in an aqueous medium;
   (c) heating the resuspended vaterite to a temperature of at least 80° C for a sufficient period of time to cause the crystal structure of said vaterite to completely convert to calcite; and
   (d) recovering the resulting calcite, which has a sodium impurity content in the range of from about 10 to 35 ppm, for use in preparing phosphor materials.

2. The method of claim 1, wherein the concentration of said ammonium carbonate solution and calcium chloride solution is maintained at about 2.5 molar.

3. The method of claim 1, wherein the pH of the calcium chloride solution is within the range from about 3 to 10.

4. The method of claim 3, wherein the pH of the calcium chloride solution is 3.5.

5. The method of claim 1, wherein said vaterite is separated from its mother liquor by filtration.

6. The method of claim 1, wherein said calcite has a particle size in the range from about 7 to 11 microns.

7. The method of claim 1, wherein the resuspended vaterite is heated to a temperature of about 85° C to cause the crystal structure of said vaterite to completely convert to calcite.

8. The method of claim 1, wherein after said meta-stable vaterite precipitate is separated from said mother liquor, said separated meta-stable vaterite is resuspended without water washing in an aqueous medium prior to said heating to effect conversion thereof to calcite.

* * * * *